US006687997B2

(12) United States Patent
Dallmeyer et al.

(10) Patent No.: US 6,687,997 B2
(45) Date of Patent: Feb. 10, 2004

(54) METHOD OF FABRICATING AND TESTING A MODULAR FUEL INJECTOR

(75) Inventors: Michael P. Dallmeyer, Newport News, VA (US); Robert MacFarland, Newport News, VA (US); Michael J. Hornby, Williamsburg, VA (US)

(73) Assignee: Siemens Automotive Corporation, Auburn Hills, MI (US)

( * ) Notice: Subject to any disclaimer, the term of this patent is extended or adjusted under 35 U.S.C. 154(b) by 81 days.

(21) Appl. No.: 09/820,768

(22) Filed: Mar. 30, 2001

(65) Prior Publication Data

US 2002/0138984 A1 Oct. 3, 2002

(51) Int. Cl.[7] ........................... B21D 51/16; B21K 1/20; B23P 17/00

(52) U.S. Cl. ............................ 29/890.128; 29/890.131; 29/888.46; 29/407.01; 29/407.1; 29/429; 29/469; 29/890.129

(58) Field of Search ....................... 29/890.124, 890.12, 29/890.128, 890.126, 890.129, 890.131, 407.01, 407.07, 407.1, 429, 428, 469, 525.14, 525.13, 888.4, 888.46, 602.1, 606; 239/585.1, 533.2, 900; 251/129.21, 129.01, 125.15

(56) References Cited

U.S. PATENT DOCUMENTS

| | | | |
|---|---|---|---|
| 3,567,135 A | 3/1971 | Gebert | |
| 4,342,427 A | 8/1982 | Gray | 239/585 |
| 4,520,962 A | 6/1985 | Momono et al. | |
| 4,552,312 A | 11/1985 | Ohno et al. | |
| 4,597,558 A | 7/1986 | Hafner et al. | |
| 4,662,567 A | 5/1987 | Knapp | |
| 4,875,658 A | 10/1989 | Asai | |
| 4,915,350 A | 4/1990 | Babitzka et al. | |
| 4,944,486 A | 7/1990 | Babitzka | |

(List continued on next page.)

FOREIGN PATENT DOCUMENTS

| | | |
|---|---|---|
| WO | WO 98/05861 | 2/1998 |
| WO | WO 00/06893 | 2/2000 |

OTHER PUBLICATIONS

U.S. patent application Ser. No. 09/233,714, Modular Two Part Fuel Injector, Philip A. Kummer, filed Jan. 19, 1999, Pending.

U.S. patent application Ser. No. 09/492,143, Fuel Injector Armature With A Spherical Valve Seal, Michael J. Hornby, filed Dec. 23, 1997, (CIP Feb. 27, 2000), Pending.

U.S. patent application Ser. No. 09/492,791, Ball Valve Fuel Injector, Michael J. Hornby, filed Dec. 23, 1997, Pending.

U.S. patent application Ser. No. 09/664,075, Solenoid Actuated Fuel Injector, Michael J. Hornby, filed Sep. 18, 2000, Pending.

(List continued on next page.)

*Primary Examiner*—Charles T. Jordan
*Assistant Examiner*—T. Nguyen

(57) ABSTRACT

A method of fabricating a modular fuel injector permits the fabrication of the electrical group subassembly outside a clean room while a fuel group subassembly is fabricated inside a clean room. The method provides for manufacturing a sealed fuel injector unit via a predetermined number of different types of operations. Each type comprises a range of percentages of the predetermined number of operations.

6 Claims, 16 Drawing Sheets

U.S. PATENT DOCUMENTS

| | | | | | |
|---|---|---|---|---|---|
| 4,946,107 | A | | 8/1990 | Hunt | |
| 4,984,744 | A | | 1/1991 | Babitzka et al. | 239/585 |
| 4,991,557 | A | | 2/1991 | DeGrace et al. | |
| 5,038,738 | A | | 8/1991 | Hafner et al. | |
| 5,054,691 | A | | 10/1991 | Huang et al. | 239/585 |
| 5,058,554 | A | | 10/1991 | Takeda et al. | |
| 5,076,499 | A | | 12/1991 | Cranford | 239/585 |
| 5,127,585 | A | | 7/1992 | Mesenich | |
| 5,167,213 | A | | 12/1992 | Bassler et al. | |
| 5,190,221 | A | | 3/1993 | Reiter | |
| 5,211,341 | A | | 5/1993 | Wieczorek | 239/585.3 |
| 5,236,174 | A | | 8/1993 | Vogt et al. | 251/129.21 |
| 5,263,648 | A | | 11/1993 | Vogt et al. | |
| 5,275,341 | A | | 1/1994 | Romann et al. | |
| 5,340,032 | A | | 8/1994 | Stegmaier et al. | |
| 5,462,231 | A | | 10/1995 | Hall | |
| 5,494,224 | A | | 2/1996 | Hall et al. | 239/585.5 |
| 5,494,225 | A | | 2/1996 | Nally et al. | 239/585.5 |
| 5,520,151 | A | | 5/1996 | Gras et al. | |
| 5,544,816 | A | | 8/1996 | Nally et al. | |
| 5,566,920 | A | | 10/1996 | Romann et al. | 251/129.21 |
| 5,580,001 | A | | 12/1996 | Romann et al. | |
| 5,678,767 | A | * | 10/1997 | Rahbar | 239/533.2 |
| 5,692,723 | A | | 12/1997 | Baxter et al. | |
| 5,718,387 | A | | 2/1998 | Awarzamani et al. | |
| 5,732,888 | A | | 3/1998 | Maier et al. | |
| 5,755,386 | A | | 5/1998 | Lavan et al. | |
| 5,769,391 | A | | 6/1998 | Noller et al. | |
| 5,769,965 | A | | 6/1998 | Liedtke et al. | |
| 5,775,355 | A | | 7/1998 | Maier et al. | |
| 5,775,600 | A | | 7/1998 | Wildeson et al. | |
| 5,803,983 | A | * | 9/1998 | Simandl et al. | 134/122.12 |
| 5,875,975 | A | | 3/1999 | Reiter et al. | |
| 5,901,688 | A | | 5/1999 | Balsdon et al. | |
| 5,915,626 | A | | 6/1999 | Awarzamani et al. | |
| 5,927,613 | A | | 7/1999 | Koyanagi et al. | |
| 5,937,887 | A | | 8/1999 | Baxter et al. | |
| 5,944,262 | A | | 8/1999 | Akutagawa et al. | |
| 5,975,436 | A | | 11/1999 | Reiter et al. | |
| 5,979,411 | A | | 11/1999 | Ricco | |
| 5,979,866 | A | * | 11/1999 | Baxter et al. | 251/129.21 |
| 5,996,227 | A | | 12/1999 | Reiter et al. | |
| 5,996,910 | A | | 12/1999 | Takeda et al. | |
| 5,996,911 | A | | 12/1999 | Gesk et al. | |
| 6,003,790 | A | | 12/1999 | Fly | |
| 6,012,655 | A | | 1/2000 | Maier | |
| 6,019,128 | A | | 2/2000 | Reiter | |
| 6,027,049 | A | | 2/2000 | Stier | |
| 6,039,271 | A | | 3/2000 | Reiter | |
| 6,039,272 | A | | 3/2000 | Ren et al. | |
| 6,045,116 | A | | 4/2000 | Willke et al. | |
| 6,047,907 | A | | 4/2000 | Hornby | |
| 6,076,802 | A | | 6/2000 | Maier | |
| 6,079,642 | A | | 6/2000 | Maier | |
| 6,089,467 | A | | 7/2000 | Fochtman et al. | |
| 6,089,475 | A | | 7/2000 | Reiter et al. | |
| 6,186,472 | B1 | | 2/2001 | Reiter | |
| 6,201,461 | B1 | | 3/2001 | Eichendorf et al. | |
| 6,328,232 | B1 | | 12/2001 | Haltiner, Jr. et al. | |
| 6,405,427 | B2 | * | 6/2002 | Kummer | 29/606 |
| 2001/0017327 | A1 | | 8/2001 | Fochtman | |
| 2001/0048091 | A1 | | 12/2001 | Enomoto et al. | |

OTHER PUBLICATIONS

U.S. patent application Ser. No. 09/750,014, Modular Fuel Injector Having A Terminal Connector Interconnecting An Electromagnetic Actuator With A Pre–Bent Electrical Terminal, Michael P. Dallmeyer, Michael J. Hornby, filed Dec. 29, 2000, Pending.

U.S. patent application Ser. No. 09/750,020, Modular Fuel Injector Having An Integral Filter And O–Ring Retainer, Michael P. Dallmeyer, Robert McFarland, filed Dec. 29, 2000, Pending.

U.S. patent application Ser. No. 09/750,023, Modular Fuel Injector Having A Surface Treatment On An Impact Surface Of An Electromagnetic Actuator And Having a Lift Set Sleeve, Michael P. Dallmeyer, Robert McFarland, Bryan Hall, Ross Wood, filed Dec. 29, 2000, Pending.

U.S. patent application Ser. No. 09/750,032, Modular Fuel Injector Having A Lift Set Sleeve, Michael P. Dallmeyer, Robert McFarland, filed Dec. 29, 2000, Pending.

U.S. patent application Ser. No. 09/750,034, Modular Fuel Injector Having Interchangeable Armature Assemblies And Having A Terminal Connector Interconnecting An Electromagnetic Actuator With An Electrical Terminal, Michael P. Dallmeyer, Michael J. Hornby, Robert McFarland, filed Dec. 29, 2000, Pending.

U.S. patent application Ser. No. 09/750,183, Modular Fuel Injector Having An Integral Filter And Dynamic Adjustment Assembly, Michael P. Dallmeyer, Robert McFarland, filed Dec. 29, 2000, Pending.

U.S. patent application Ser. No. 09/750,190, Modular Fuel Injector Having A Surface Treatment On An Impact Surface Of An Electromagnetic Actuator And Having An Integral Filter And O–Ring Retainer Assembly, Michael P. Dallmeyer, Robert McFarland, Bryan Hall, Ross Wood, filed Dec. 29, 2000, Pending.

U.S. patent application Ser. No. 09/750,277, Modular Fuel Injector Having An Integral Or Interchangeable Inlet Tube And Having An Integral Filter And Dynamic Adjustment Assembly, Michael P. Dallmeyer, Robert McFarland, filed Dec. 29, 2000, Pending.

U.S. patent application Ser. No. 09/750,278, Modular Fuel Injector Having A Low Mass, High Efficiency Electromagnetic Actuator And Having An Integral Filter And Dynamic Adjustment Assembly, Michael P. Dallmeyer, Robert McFarland, James Robert Parish, Dennis Bulgatz, filed Dec. 29, 2000, Pending.

U.S. patent application Ser. No. 09/750,323, Modular Fuel Injector Having A Low Mass, High Efficiency Electromagnetic Actuator And Having A Terminal Connector Interconnecting An Electromagnetic Actuator With An Electrical Terminal, Michael P. Dallmeyer, Michael J. Hornby, James Robert Parish, filed Dec. 29, 2000, Pending.

U.S. patent application Ser. No. 09/750,324, Modular Fuel Injector Having A Snap–On Orifice Disk Retainer And Having An Integral Filter And Dynamic Adjustment Assembly, Michael P. Dallmeyer, Robert McFarland, filed Dec. 29, 2000, Pending.

U.S. patent application Ser. No. 09/750,325, Modular Fuel Injector Having A Low Mass, High Efficiency Electromagnetic Actuator And Having A Lift Set Sleeve, Michael P. Dallmeyer, Robert McFarland, James Robert Parish, Dennis Bulgatz, filed Dec. 29, 2000, Pending.

U.S. patent application Ser. No. 09/750,326, Modular Fuel Injector Having A Surface Treatment On An Impact Surface Of An Electromagnetic Actuator And Having A Terminal Connector Interconnecting An Electromagnetic Actuator With An Electrical Terminal, Michael P. Dallmeyer, Michael Hornby, Bryan Hall, Ross Wood, filed Dec. 29, 2000, Pending.

U.S. patent application Ser. No. 09/750,327, Modular Fuel Injector Having An Integral Or Interchangeable Inlet Tube And Having A Terminal Connector Interconnecting An Electromagnetic Actuator With An Electrical Terminal, Michael P. Dallmeyer, Michael Hornby, Robert McFarland, filed Dec. 29, 2000, Pending.

U.S. patent application Ser. No. 09/750,328, Modular Fuel Injector Having A Low Mass, High Efficiency Electromagnetic Actuator And Having An Integral Filter and O–Ring Retainer Assembly, Michael P. Dallmeyer, Robert McFarland, James Robert Parish, Dennis Bulgatz, filed Dec. 29, 2000, Pending.

U.S. patent application Ser. No. 09/750,329, Modular Fuel Injector Having An Integral Or Interchangeable Inlet Tube And Having An Integral Filter And O–Ring Retainer Assembly, Michael P. Dallmeyer, Robert McFarland, filed Dec. 29, 2000, Pending.

U.S. patent application Ser. No. 09/750,330, Modular Fuel Injector Having Interchangeable Armature Assemblies And Having An Integral Filter And O–Ring Retainer Assembly, Michael P. Dallmeyer, Robert McFarland, Michael Hornby, filed Dec. 29, 2000, Pending.

U.S. patent application Ser. No. 09/750,331, Modular Fuel Injector Having Interchangeable Armature Assemblies And Having An Integral Filter And Dynamic Adjustment Assembly, Michael P. Dallmeyer, Robert McFarland, Michael J. Hornby, filed Dec. 29, 2000, Pending.

U.S. patent application Ser. No. 09/750,332, Modular Fuel Injector Having A Snap–On Orifice Disk Retainer And Having A Terminal Connector Interconnecting An Electromagnetic Actuator With An Electrical Terminal, Michael P. Dallmeyer, Michael J. Hornby, Robert McFarland, filed Dec. 29, 2000, Pending.

U.S. patent application Ser. No. 09/750,333, Modular Fuel Injector Having A Snap–On Orifice Disk Retainer And Having An Integral Filter And O–Ring Retainer Assembly, Michael P. Dallmeyer, Robert McFarland, filed Dec. 29, 2000, Pending.

U.S. patent application Ser. No. 09/750,334, Modular Fuel Injector Having A Snap–On Orifice Disk Retainer And Having A Lift Set Sleeve, Michael P. Dallmeyer, Robert McFarland, filed Dec. 29, 2000, Pending.

U.S. patent application Ser. No. 09/750,335, Modular Fuel Injector Having An Integral Or Interchangeable Inlet Tube And Having A Lift Set Sleeve, Michael P. Dallmeyer, Robert McFarland, filed Dec. 29, 2000, Pending.

U.S. patent application Ser. No. 09/750,336, Modular Fuel Injector Having A Surface Treatment On An Impact Surface Of An Electromagnetic Actuator And Having An Integral Filter And Dynamic Adjustment Assembly, Michael P. Dallmeyer, Robert McFarland, Bryan Hall, Ross Wood, filed Dec. 29, 2000, Pending.

U.S. patent application Ser. No. 09/750,337, Modular Fuel Injector Having Interchangeable Armature Assemblies And Having A Lift Set Sleeve, Michael P. Dallmeyer, Robert McFarland, Michael Hornby, filed Dec. 29, 2000, Pending.

Method Of Making A Solenoid Actuated Fuel Injector, Philip A. Kummer, filed Jan. 19, 1999, Pending.

U.S. patent application Ser. No. 09/820,657, Methods Of Setting Armature Lift In A Modular Fuel Injector, Michael P. Dallmeyer, Michael Hornby, filed Mar. 30, 2001, Pending.

U.S. patent application Ser. No. 09/820,672, Method Of Manufacturing A Modular Fuel Injector, Michael P. Dallmeyer, Robert McFarland, Michael Hornby, filed Mar. 30, 2001, Pending.

U.S. patent application Ser. No. 09/820,768, Method Of Fabricating And Testing A Modular Fuel Injector, Michael P. Dallmeyer, Robert McFarland, Michael Hornby, filed Mar. 30, 2001, Pending.

U.S. patent application Ser. No. 09/820,887, Method Of Fabricating A Modular Fuel Injector, Michael P. Dallmeyer, Robert McFarland, Michael Hornby, filed Mar. 30, 2001, Pending.

U.S. patent application Ser. No. 09/820,888, Method Of Connecting Components Of A Modular Fuel Injector, Michael P. Dallmeyer, Robert McFarland, filed Mar. 30, 2001, Pending.

U.S. patent application Ser. No. 09/828,487, Modular Fuel Injector And Method Of Assembling The Modular Fuel Injector, Michael Hornby, Michael P. Dallmeyer, filed Apr. 09, 2001, Pending.

* cited by examiner

200

METHOD OF FABRICATING AND TESTING A MODULAR FUEL INJECTOR

BACKGROUND OF THE INVENTION

It is believed that examples of known fuel injection systems use an injector to dispense a quantity of fuel that is to be combusted in an internal combustion engine. It is also believed that the quantity of fuel that is dispensed is varied in accordance with a number of engine parameters such as engine speed, engine load, engine emissions, etc.

It is believed that examples of known electronic fuel injection systems monitor at least one of the engine parameters and electrically operate the injector to dispense the fuel. It is believed that examples of known injectors use electromagnetic coils, piezoelectric elements, or magnetostrictive materials to actuate a valve.

It is believed that examples of known valves for injectors include a closure member that is movable with respect to a seat. Fuel flow through the injector is believed to be prohibited when the closure member sealingly contacts the seat, and fuel flow through the injector is believed to be permitted when the closure member is separated from the seat.

It is believed that examples of known injectors include a spring providing a force biasing the closure member toward the seat. It is also believed that this biasing force is adjustable in order to set the dynamic properties of the closure member movement with respect to the seat.

It is further believed that examples of known injectors include a filter for separating particles from the fuel flow, and include a seal at a connection of the injector to a fuel source.

It is believed that such examples of the known injectors have a number of disadvantages.

It is believed that examples of known injectors must be assembled entirely in an environment that is substantially free of contaminants. It is also believed that examples of known injectors can only be tested after final assembly has been completed.

SUMMARY OF THE INVENTION

According to the present invention, a fuel injector can comprise a plurality of modules, each of which can be independently assembled and tested. According to one embodiment of the present invention, the modules can comprise a fluid handling subassembly and an electrical subassembly. These subassemblies can be subsequently assembled to provide a fuel injector according to the present invention.

The present invention provides for a method of manufacturing a modular fuel injector. The method comprises providing a clean room, manufacturing a sealed fuel injector unit via a predetermined number of operations by fabricating a fuel group in the clean room; testing the fuel injector including testing the fuel group and a power group; performing welding operations on at least one of the fuel group and power group; machining and performing screw machine operations on at least one of the fuel group and power group; and assembling the fuel group with a power group outside the clean room into a sealed modular fuel injector unit. Each of the fabricating, testing, performing, machining and assembling operation comprises, respectively, a specified range of the predetermined number of operations.

The present invention further provides a method of assembling a modular fuel injector. The method comprises providing a clean room, assembling a ready-to-deliver modular fuel injector unit by a predetermined number of assembling operations. The assembling operations include fabricating a fuel group in the clean room that comprises between 52 to 62 percent of the predetermined number of operations; testing the fuel injector including testing the fuel group and a power group that comprises between 3 to 13 percent of the predetermined number of operations; performing welding operations on at least one of the fuel group and power group that comprise between 3 to 8 percent of the predetermined number of operations; machining and performing machine screw operations on at least one of the fuel group and power group that comprise between 3 to 9 percent of the predetermined number of operations; and assembling the fuel group with a power group outside the clean room into a ready-to-deliver modular fuel injector unit that comprises between 12 to 22 percent of the predetermined number of operations.

BRIEF DESCRIPTION OF THE DRAWINGS

The accompanying drawings, which are incorporated herein and constitute part of this specification, illustrate an embodiment of the invention, and, together with the general description given above and the detailed description given below, serve to explain features of the invention.

DETAILED DESCRIPTION OF THE PREFERRED EMBODIMENT

Figure 1:
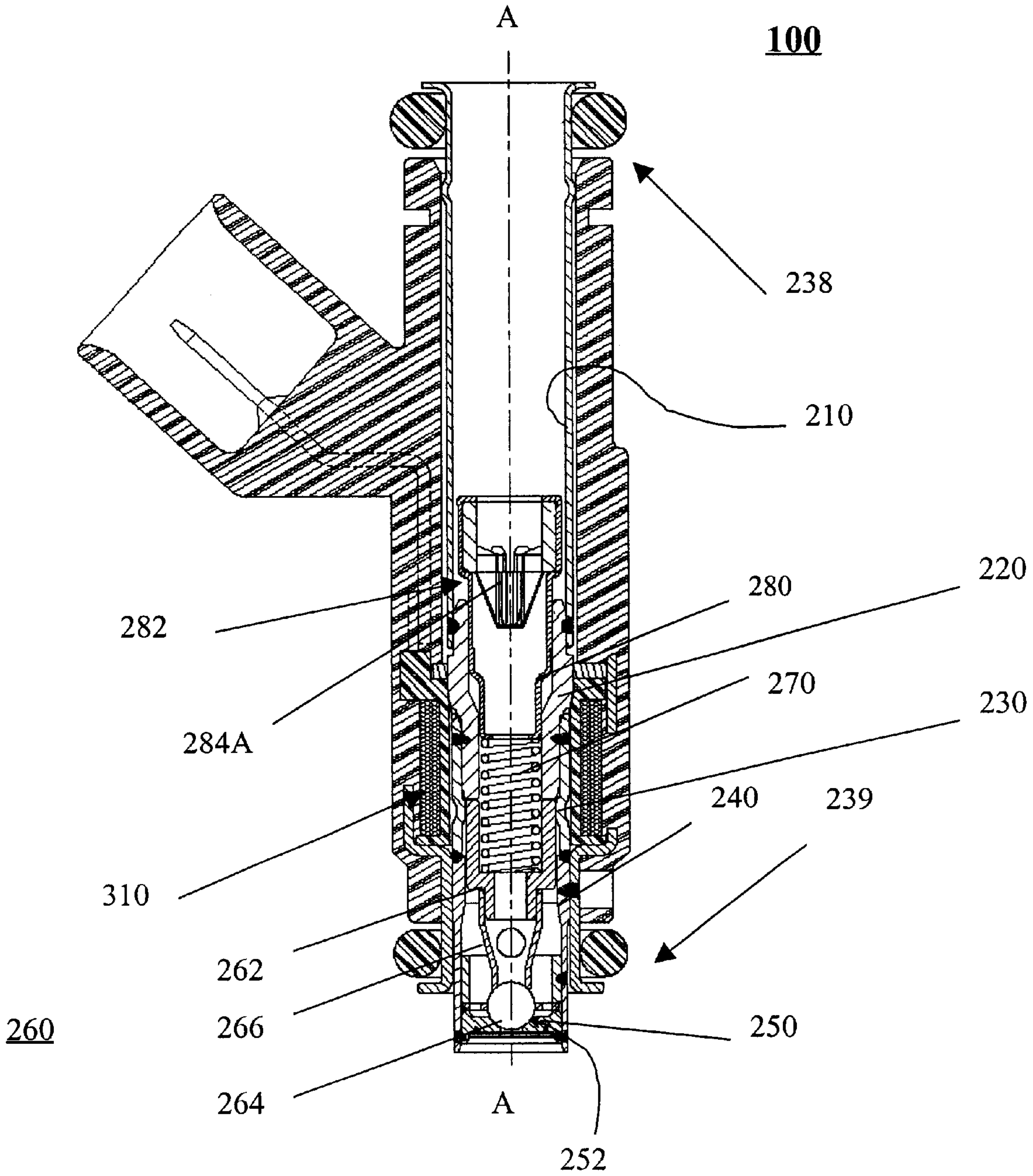
FIG. 1 is a cross-sectional view of a fuel injector according to the present invention.

Referring to FIGS. 1–4, a solenoid actuated fuel injector 100 dispenses a quantity of fuel that is to be combusted in an internal combustion engine (not shown). The fuel injector 100 extends along a longitudinal axis A—A between a first injector end 238 and a second injector end 239, and includes a valve group subassembly 200 and a power group subassembly 300. The valve group subassembly 200 performs fluid handling functions, e.g., defining a fuel flow path and prohibiting fuel flow through the injector 100. The power group subassembly 300 performs electrical functions, e.g., converting electrical signals to, a driving force for permitting fuel flow through the injector 100.

Figure 2:
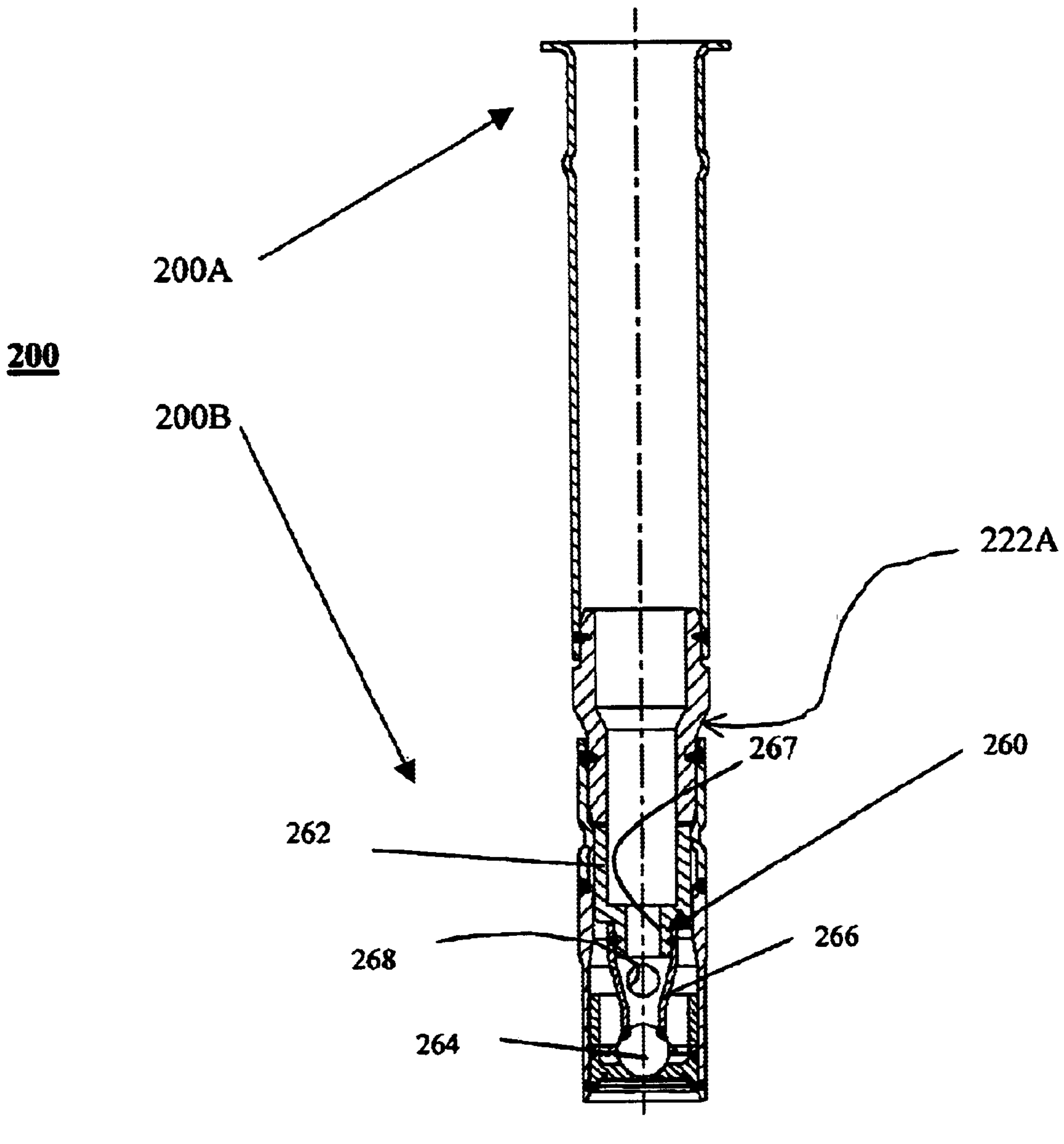
FIG. 2 is a cross-sectional view of a fluid handling subassembly of the fuel injector shown in FIG. 1.

Referring to FIGS. 1 and 2, the valve group subassembly 200 comprises a tube assembly extending along the longitudinal axis A—A between a first tube assembly end 200A and a second tube assembly end 200B. The tube assembly includes at least an inlet tube, a non-magnetic shell 230, and a valve body 240. The inlet tube 210 has a first inlet tube end proximate to the first tube assembly end 200A. A second end of the inlet tube 210 is connected to a first shell end of the non-magnetic shell 230. A second shell end of the non-magnetic shell 230 is connected to a first valve body end of the valve body 240. And a second valve body end of the valve body 240 is proximate to the second tube assembly end 200B. The inlet tube 210 can be formed by a deep drawing process or by a rolling operation. A pole piece can be integrally formed at the second inlet tube end of the inlet tube 210 or, as shown, a separate pole piece 220 can be connected to a partial inlet tube 210 and connected to the first shell end of the non-magnetic shell 230. The non-magnetic shell 230 can comprise diamagnetic stainless steel 430FR, or any other suitable material demonstrating substantially equivalent structural and magnetic properties.

An armature assembly 260 is disposed in the tube assembly. The armature assembly 260 includes a first armature assembly end having a ferro-magnetic or armature portion 262 and a second armature assembly end having a sealing portion. The armature assembly 260 is disposed in the tube assembly such that the magnetic portion, or "armature," 262 confronts the pole piece 220. The sealing portion can include a closure member 264, e.g., a spherical valve element, that is moveable with respect to the seat 250 and its sealing surface 252. The closure member 264 is movable between a closed configuration, as shown in FIGS. 1 and 2, and an open configuration (not shown). In the closed configuration, the closure member 264 contiguously engages the sealing surface 252 to prevent fluid flow through the opening. In the open configuration, the closure member 264 is spaced from the seat 250 to permit fluid flow through the opening. The armature assembly 260 may also include a separate intermediate portion 266 connecting the ferro-magnetic or armature portion 262 to the closure member 264. The intermediate portion or armature tube 266 can be fabricated by various techniques, for example, a plate can be rolled and its seams welded or a blank can be deep-drawn to form a seamless tube. The intermediate portion 266 is preferable due to its ability to reduce magnetic flux leakage from the magnetic circuit of the fuel injector 100. This ability arises from the fact that the intermediate portion or armature tube 266 can be non-magnetic, thereby magnetically decoupling the magnetic portion or armature 262 from the ferro-magnetic closure member 264. Because the ferro-magnetic closure member 264 is decoupled from the ferro-magnetic or armature 262, flux leakage is reduced, thereby improving the efficiency of the magnetic circuit. To reduce flux leakage, a non-magnetic closure member 264 is can be used in conjunction with the non-magnetic armature tube 266.

A seat 250 is secured at the second end of the tube assembly. The seat 250 defines an opening centered on the fuel injector's longitudinal axis A—A and through which fuel can flow into the internal combustion engine (not shown). The seat 250 includes a sealing surface surrounding the opening. The sealing surface, which faces the interior of the valve body 240, can be frustoconical or concave in shape, and can have a finished surface. An orifice plate 254 can be used in connection with the seat 250 to provide at least one precisely sized and oriented orifice in order to obtain a particular fuel spray pattern.

Figure 2A:
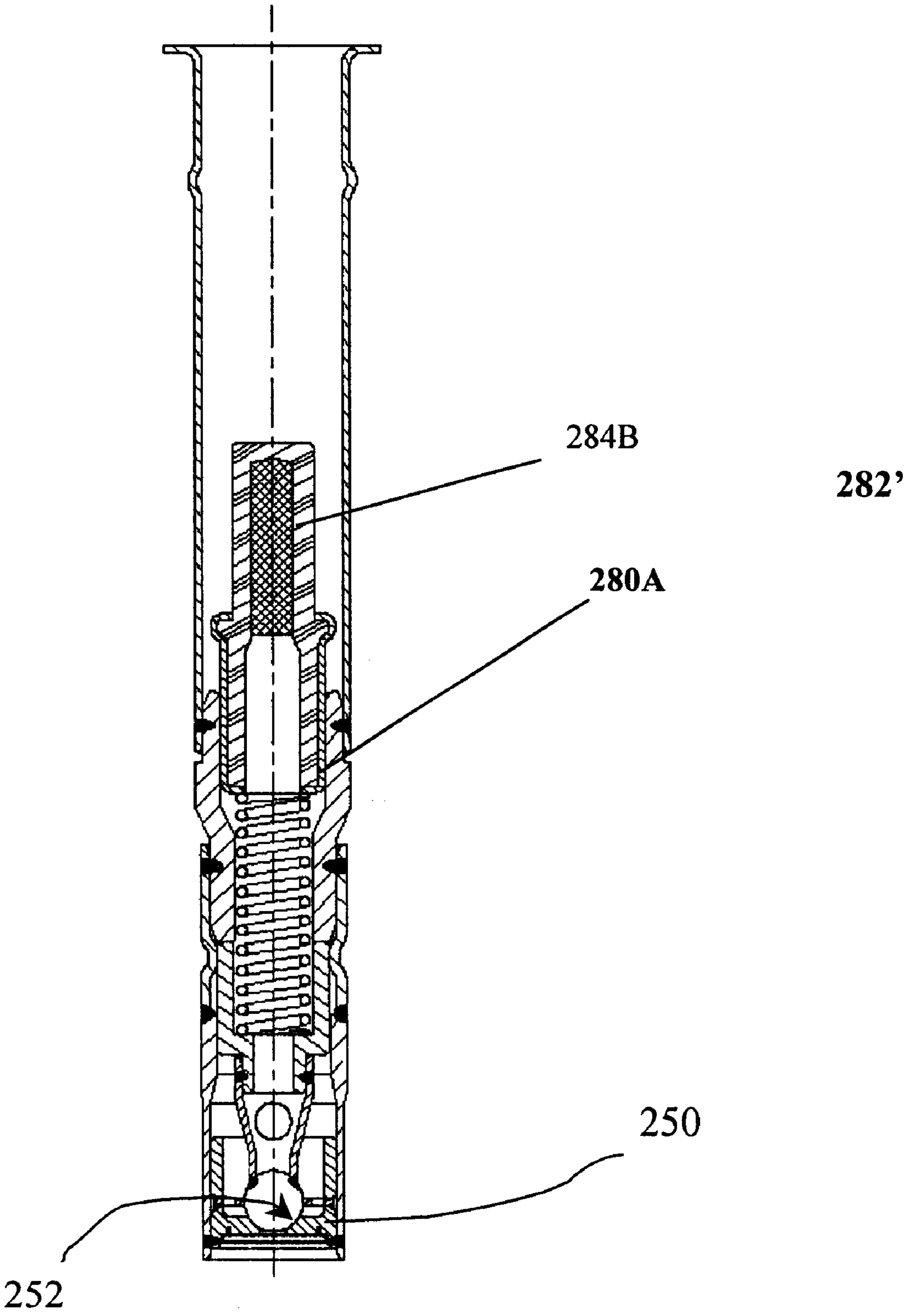
FIG. 2A is a cross-sectional view of a variation on the fluid handling subassembly of FIG. 2.
Figure 2B:
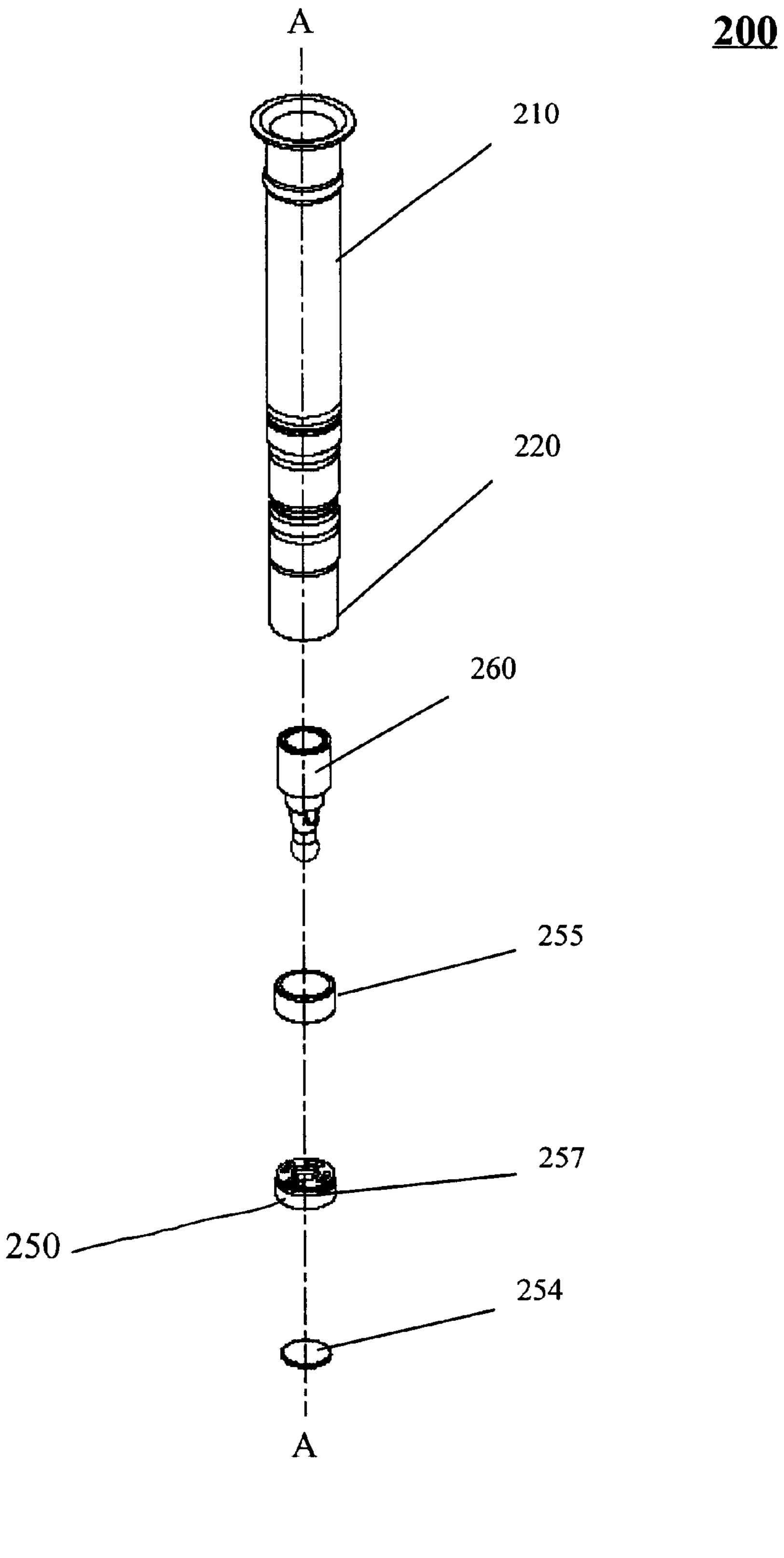
FIGS. 2B and 2C are exploded views of the components of lift setting feature of the present invention.

With reference to FIG. 2B, a lift sleeve 255 is telescopically mounted in the valve body 240 to set the seat 250 at a predetermined axial distance from the inlet tube 210 or the armature in the tube assembly. This feature can be seen in the exploded view of FIG. 2B wherein the separation distance between the seat 250 and the armature can be set by inserting the lift sleeve 255 in a telescopic fashion into the valve body 240. The use of lift sleeve 255 allows the injector lift to be set and, optionally, tested prior to final assembly of the injector. Furthermore, adjustment to the lift can be done by moving the lift sleeve 255 in either axial direction as opposed to scrapping the whole injector. Once the injector lift is determined to be correct, the lift sleeve 255 is affixed to the housing 330 by a laser weld.

Figure 2C:
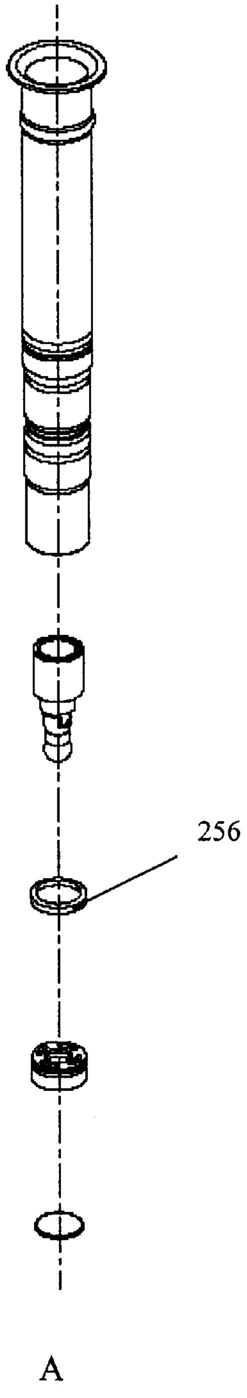

Alternatively, a crush ring 256 can be used in lieu of a lift sleeve 255 to set the injector lift height, as shown in FIG. 2C. The use of a crush ring 256 is believed to allow for quicker injector assembly when the dimensions of the inlet tube, non-magnetic shell 230, valve body 240 and armature are fixed for a large production run.

An armature assembly 260 is disposed in the tube assembly. The armature assembly 260 includes a first armature assembly end having a ferro-magnetic or armature portion 262 and a second armature assembly end having a sealing portion. The armature assembly 260 is disposed in the tube assembly such that the magnetic portion, or "armature," 262 confronts the pole piece 220. The sealing portion can include a closure member 264, e.g., a spherical valve element, that is moveable with respect to the seat 250 and its sealing surface 252. The closure member 264 is movable between a closed configuration, as shown in FIGS. 1 and 2, and an open configuration (not shown). In the closed configuration, the closure member 264 contiguously engages the sealing surface 252 to prevent fluid flow through the opening. In the open configuration, the closure member 264 is spaced from the seat 250 to permit fluid flow through the opening. The armature assembly 260 may also include a separate intermediate portion or armature tube 266 connecting the ferro-magnetic or armature portion 262 to the closure member 264.

At least one axially extending through-bore 267 and at least one aperture 268 through a wall of the armature assembly 260 can provide fuel flow through the armature assembly 260. The apertures 268, which can be of any shape, preferably are axially elongated to facilitate the passage of gas bubbles. For example, in the case of a separate intermediate portion 266 that is formed by rolling a sheet substantially into a tube, the apertures 268 can be an axially extending slit defined between non-abutting edges of the rolled sheet. The apertures 268 provide fluid communication between the at least one through-bore 267 and the interior of the valve body 240. Thus, in the open configuration, fuel can be communicated from the through-bore 267, through the apertures 268 and the interior of the valve body 240, around the closure member 264, and through the opening into the engine (not shown).

In the case of a spherical valve element providing the closure member 264, the spherical valve element can be connected to the armature assembly 260 at a diameter that is less than the diameter of the spherical valve element. Such a connection would be on side of the spherical valve element that is opposite contiguous contact with the seat. A lower armature guide 257 can be disposed in the tube assembly, proximate the seat, and would slidingly engage the diameter of the spherical valve element. The lower armature guide 257 can facilitate alignment of the armature assembly 260 along the axis A—A, and while the armature tube 266 can magnetically decouple the closure member 264 from the ferro-magnetic or armature portion 262 of the armature assembly 260.

A resilient member 270 is disposed in the tube assembly and biases the armature assembly 260 toward the seat. A filter assembly 282 comprising a filter 284A and an adjusting tube 280 is also disposed in the tube assembly. The filter assembly 282 includes a first end and a second end. The filter 284A is disposed at one end of the filter assembly 282 and also located proximate to the first end of the tube assembly and apart from the resilient member 270 while the adjusting tube 280 is disposed generally proximate to the second end of the tube assembly. The adjusting tube 280 engages the resilient member 270 and adjusts the biasing force of the member with respect to the tube assembly. In particular, the adjusting tube 280 provides a reaction member against which the resilient member 270 reacts in order to close the injector valve 100 when the power group subassembly 300 is de-energized. The position of the adjusting tube 280 can be retained with respect to the inlet tube 210 by an interference fit between an outer surface of the adjusting tube 280 and an inner surface of the tube assembly. Thus, the position of the adjusting tube 280 with respect to the inlet tube 210 can be used to set a predetermined dynamic characteristic of the armature assembly 260. Alternatively, as shown in FIG. 2A, a filter assembly 282' comprising adjusting tube 280A and inverted cup-shaped filtering element 284B can be utilized in place of the cone type filter assembly 282.

The valve group subassembly 200 can be assembled as follows. The non-magnetic shell 230 is connected to the inlet tube 210 and to the valve body 240. The filter assembly 282 or 282' is inserted along the axis A—A from the first inlet tube end 200A of the inlet tube 210. Next, the resilient member 270 and the armature assembly 260 (which was previously assembled) are inserted along the axis A—A from the second valve body end of the valve body 240. The filter assembly 282 or 282' can be inserted into the inlet tube 210 to a predetermined distance so as to abut the resilient member. The position of the filter assembly 282 or 282' with respect to the inlet tube 210 can be used to adjust the dynamic properties of the resilient member, e.g., so as to ensure that the armature assembly 260 does not float or bounce during injection pulses. The seat 250 and orifice plate 254 are then inserted along the axis A—A from the second valve body end of the valve body 240. At this time, a probe can be inserted from either the inlet end or the orifice to check for the lift of the injector. If the injector lift is correct, the lift sleeve 255 and the seat 250 are fixedly attached to the valve body 240. Preferably, the injector lift can also be set via adjustment of relative axial positions of the non-magnetic shell 230 and the pole piece 220 before the two parts are affixed together. Regardless of the technique(s) used, each of the lift sleeve 255, seat 250 or the non-magnetic shell 230 can be fixedly attached to one another or to the valve body 240 by known attachment techniques, including, for example, bonding, laser welding, crimping, friction welding, or conventional welding, and preferably laser welding.

Figure 3:
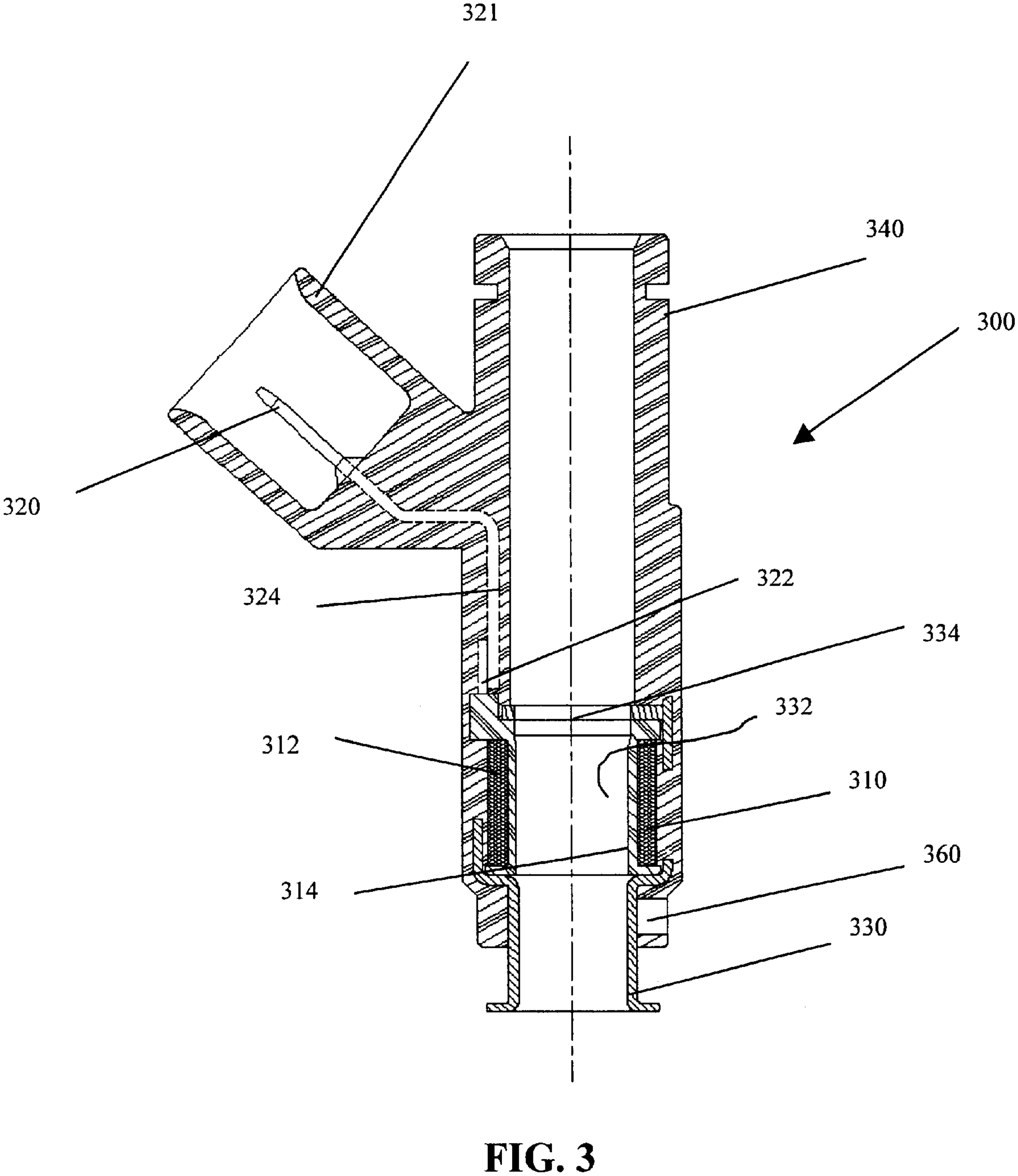
FIG. 3 is a cross-sectional view of an electrical subassembly of the fuel injector shown in FIG. 1.

Referring to FIGS. 1 and 3, the power group subassembly 300 comprises an electromagnetic coil 310, at least one terminal 320 (there are two according to a preferred embodiment), a housing 330, and an overmold 340. The electromagnetic coil 310 comprises a wire that that can be wound on a bobbin 314 and electrically connected to electrical contact 322 supported on the bobbin 314. When energized, the coil generates magnetic flux that moves the armature assembly 260 toward the open configuration, thereby allowing the fuel to flow through the opening. De-energizing the electromagnetic coil 310 allows the resilient member 270 to return the armature assembly 260 to the closed configuration, thereby shutting off the fuel flow. Each electrical terminal 320 is in electrical communication via an axially extending contact portion 324 with a respective electrical contact 322 of the coil 310. The housing 330, which provides a return path for the magnetic flux, generally comprises a ferromagnetic cylinder 332 surrounding the electromagnetic coil 310 and a flux washer 334 extending from the cylinder toward the axis A—A. The flux washer 334 can be integrally formed with or separately attached to the cylinder. The housing 330 can include holes and slots 330A, or other discontinuities to break-up eddy currents that can occur when the coil is energized. Additionally, the housing 330 is provided with scalloped circumferential edge 331 to provide a mounting relief for the bobbin 314. The overmold 340 maintains the relative orientation and position of the electromagnetic coil 310, the at least one electrical terminal 320, and the housing 330. The overmold 340 can also form an electrical harness connector portion 321 in which a portion of the terminals 320 are exposed. The terminals 320 and the electrical harness connector portion 321 can engage a mating connector, e.g., part of a vehicle wiring harness (not shown), to facilitate connecting the injector 100 to a supply of electrical power (not shown) for energizing the electromagnetic coil 310.

According to a preferred embodiment, the magnetic flux generated by the electromagnetic coil 310 flows in a circuit that comprises the pole piece 220, a working air gap between the pole piece 220 and the magnetic armature portion 262, a parasitic air gap between the magnetic armature portion 262 and the valve body 240, the housing 330, and the flux washer 334.

The coil group subassembly 300 can be constructed as follows. As shown in FIG. 3B, a plastic bobbin 314 can be molded with the electrical contacts 322. The wire 312 for the electromagnetic coil 310 is wound around the plastic bobbin 314 and connected to the electrical contact 322. The housing 330 is then placed over the electromagnetic coil 310 and bobbin 314 unit. The bobbin 314 can be formed with at least one retaining prongs 314A which, in combination with an overmold 340, are utilized to fix the bobbin 314 to the overmold 340 once the overmold is formed. The terminals 320 are pre-bent to a proper configuration such that the pre-aligned terminals 320 are in alignment with the to-be-formed harness connector 321 when a polymer is poured or injected into a mold (not shown) for the electrical subassembly. The terminals 320 are then electrically connected via the axially extending portion 324 to respective electrical contacts 322. The completed bobbin 314 is then placed into the housing 330 at a proper orientation by virtue of the scalloped-edge 331. An overmold 340 is then formed to maintain the relative assembly of the coil/bobbin unit, housing 330, and terminals 320. The overmold 340 also provides a structural case for the injector and provides predetermined electrical and thermal insulating properties. A separate collar (not shown) can be connected, e.g., by bonding, and can provide an application specific characteristic such as orientation identification features for the injector 100. Thus, the overmold 340 provides a universal arrangement that can be modified with the addition of a suitable collar. To reduce manufacturing and inventory costs, the coil/bobbin unit can be the same for different applications. As such, the terminals 320 and overmold 340 (or collar, if used) can be varied in size and shape to suit particular tube assembly lengths, mounting configurations, electrical connectors, etc.

Figure 3A:
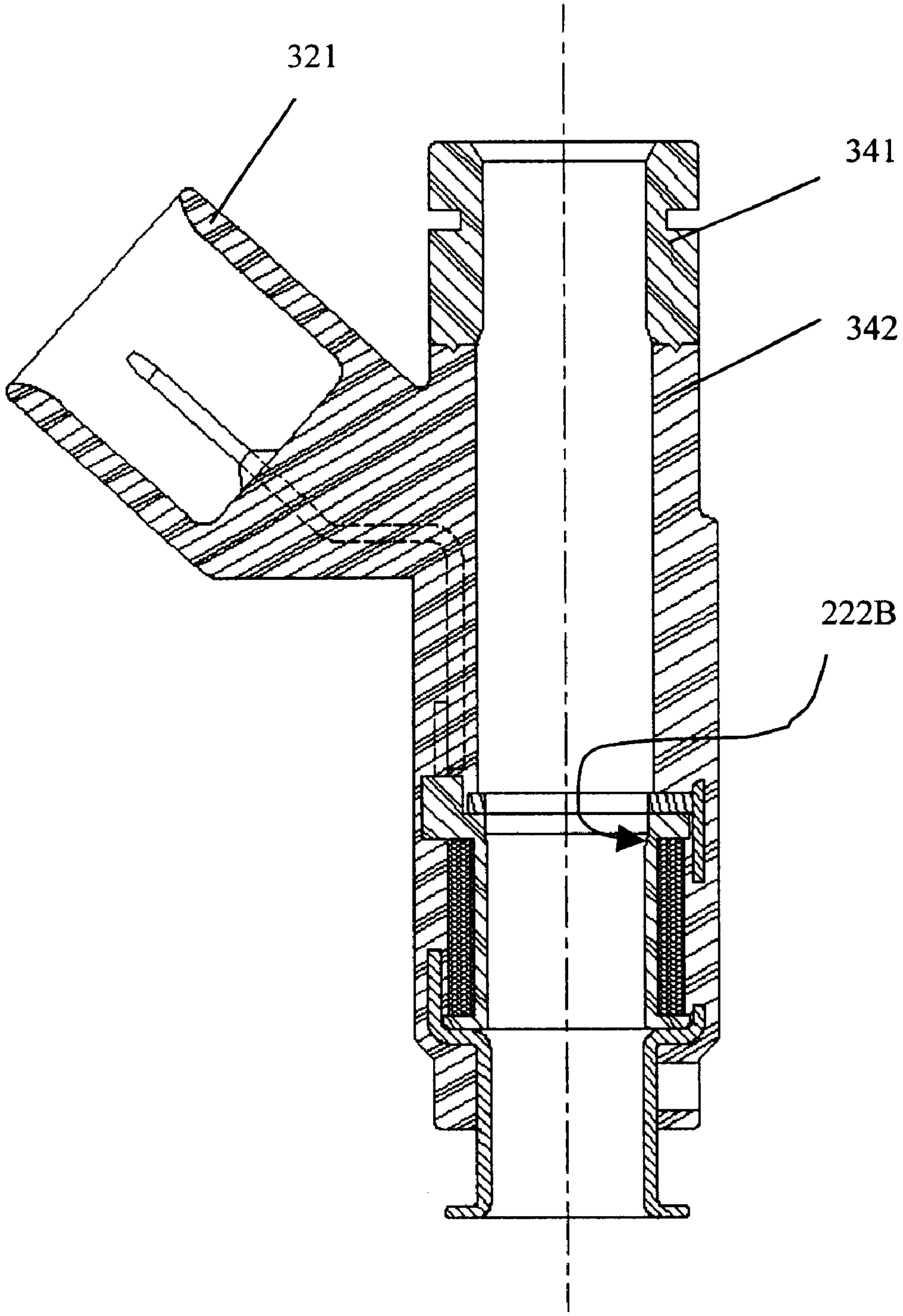
FIG. 3A is a cross-sectional view of the two overmolds for the electrical subassembly of FIG. 1.
Figure 3B:
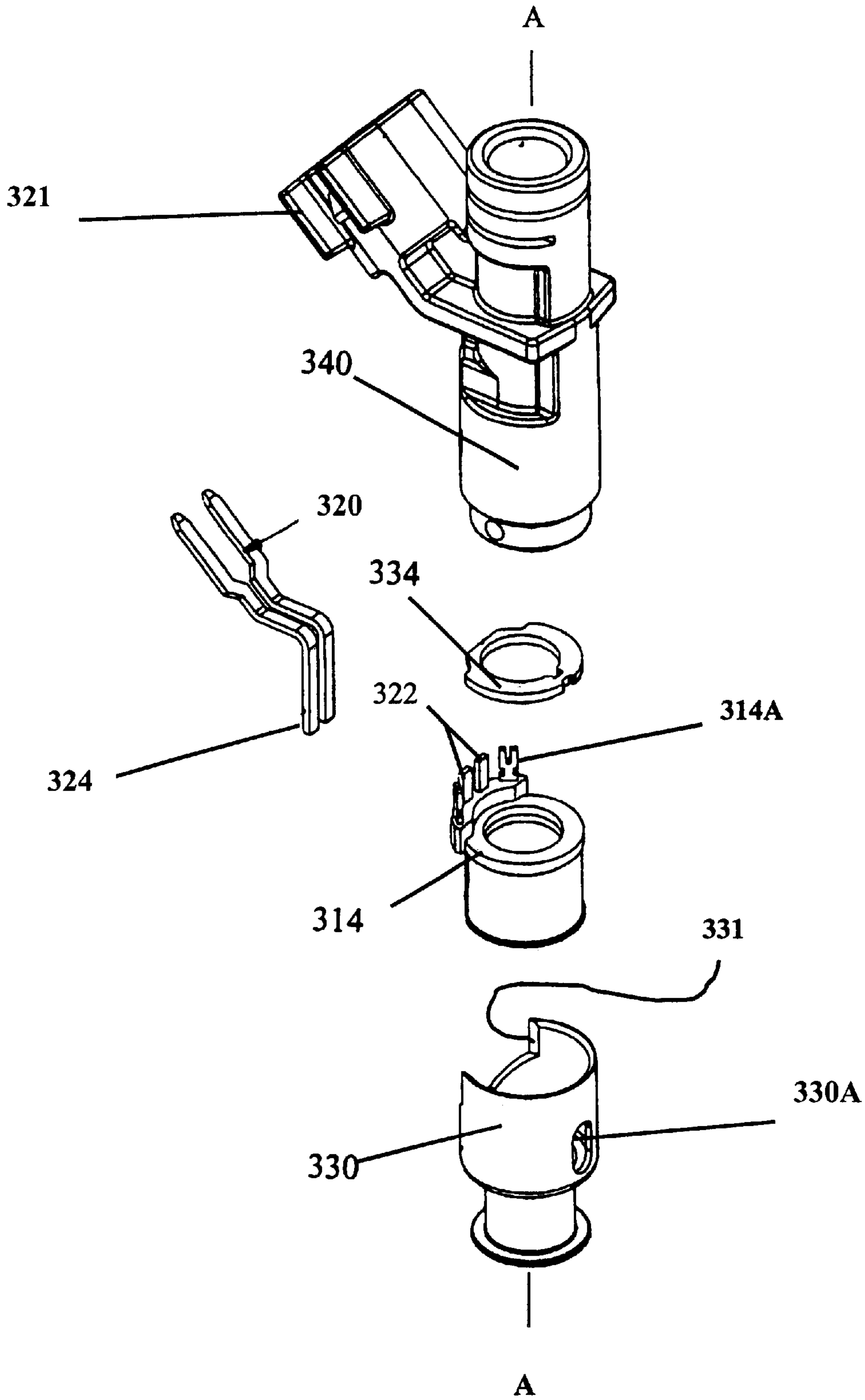
FIG. 3B is an exploded view of the electrical subassembly of the fuel injector of FIG. 1.

Alternatively, as shown in FIG. 3A, a two-piece overmold allows for a first overmold 341 that is application specific while the second overmold 342 can be for all applications. The first overmold 341 is bonded to a second overmold 342, allowing both to act as electrical and thermal insulators for the injector. Additionally, a portion of the housing 330 can project beyond the over-mold to allow the injector to accommodate different injector tip lengths.

Figure 4:
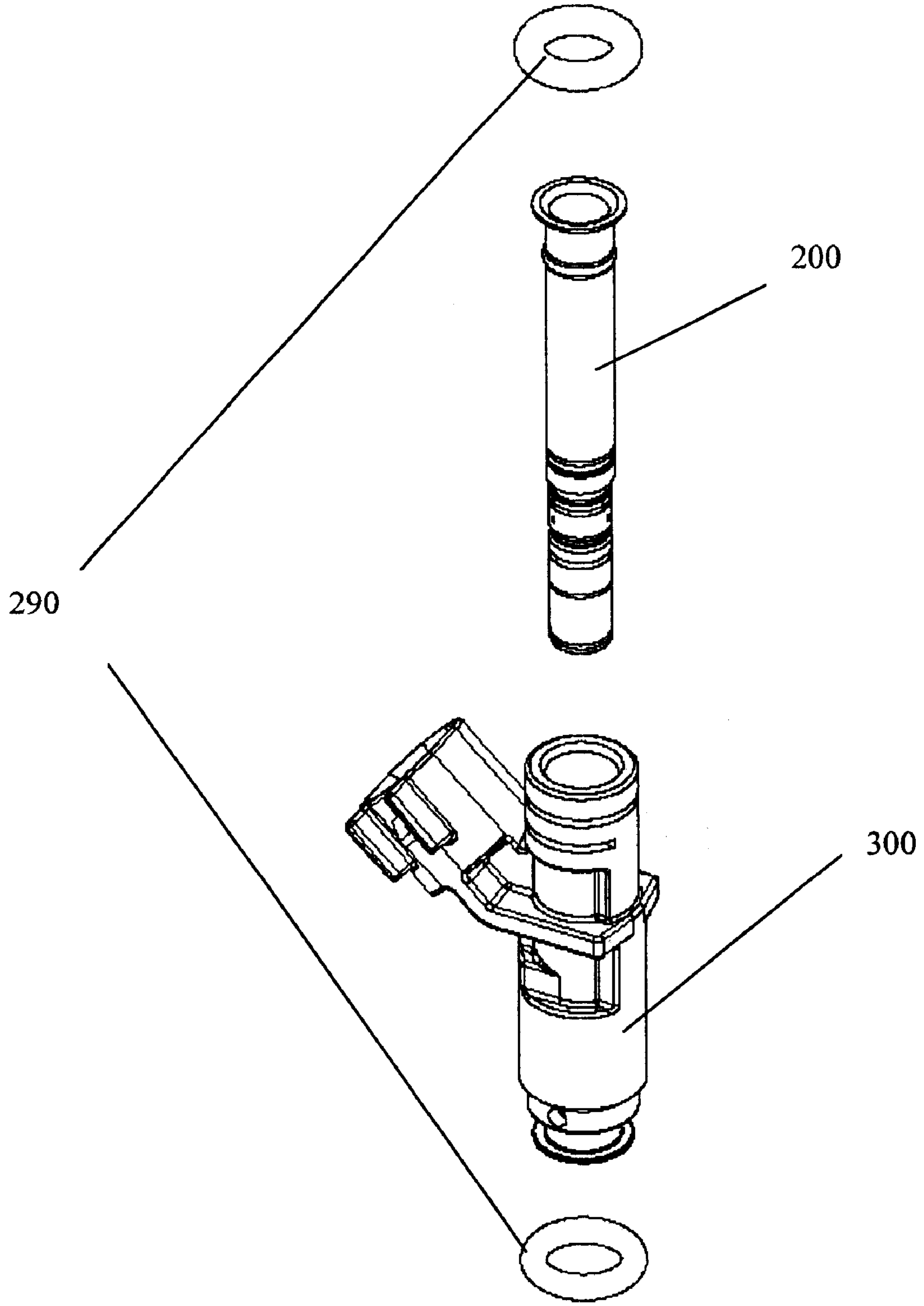
FIG. 4 is an isometric view that illustrates assembling the fluid handling and electrical subassemblies that are shown in FIGS. 2 and 3, respectively.

As is particularly shown in FIGS. 1 and 4, the valve group subassembly 200 can be inserted into the coil group subassembly 300. Thus, the injector 100 is made of two modular subassemblies that can be assembled and tested separately, and then connected together to form the injector 100. The valve group subassembly 200 and the coil group subassembly 300 can be fixedly attached by adhesive, welding, or another equivalent attachment process. According to a preferred embodiment, a hole 360 through the overmold 340 exposes the housing 330 and provides access for laser welding the housing 330 to the valve body 240. The O-rings 290 can be mounted at the respective first and second injector ends 238 and 239.

The first injector end 238 can be coupled to the fuel supply of an internal combustion engine (not shown). The O-ring 290 can be used to seal the first injector end 238 to the fuel supply so that fuel from a fuel rail (not shown) is supplied to the tube assembly, with the O-ring 290 making a fluid tight seal, at the connection between the injector 100 and the fuel rail (not shown).

In operation, the electromagnetic coil 310 is energized, thereby generating magnetic flux in the magnetic circuit. The magnetic flux moves armature assembly 260 (along the axis A—A, according to a preferred embodiment) towards the integral pole piece 220, i.e., closing the working air gap. This movement of the armature assembly 260 separates the closure member 264 from the seat 250 and allows fuel to flow from the fuel rail (not shown), through the inlet tube 210, the through-bore 267, the apertures 268 and the valve body 240, between the seat 250 and the closure member 264, through the opening, and finally through the orifice disk 254 into the internal combustion engine (not shown). When the electromagnetic coil 310 is de-energized, the armature assembly 260 is moved by the bias of the resilient member 270 to contiguously engage the closure member 264 with the seat 250, and thereby prevent fuel flow through the injector 100.

Referring to FIGS. 5, 5A–5F, a preferred assembly process can be as follows:

1. A pre-assembled valve body and non-magnetic sleeve is located with the valve body oriented up in a clean room.
2. A screen retainer, e.g., a lift sleeve, is loaded into the valve body/non-magnetic sleeve assembly.
3. A lower screen can be loaded into the valve body/non-magnetic sleeve assembly.
4. A pre-assembled seat and guide assembly is loaded into the valve body/non-magnetic sleeve assembly.
5. The seat/guide assembly is pressed to a desired position within the valve body/non-magnetic sleeve assembly.
6. The valve body is welded, e.g., by a continuous wave laser forming a hermetic lap seal, to the seat.
7. A first leak test is performed on the valve body/non-magnetic sleeve assembly. This test can be performed pneumatically.
8. The valve body/non-magnetic sleeve assembly is inverted so that the non-magnetic sleeve is oriented up.
9. An armature assembly is loaded into the valve body/non-magnetic sleeve assembly.
10. A pole piece is loaded into the valve body/non-magnetic sleeve assembly and pressed to a pre-lift position.
11. Dynamically, e.g., pneumatically, purge valve body/non-magnetic sleeve assembly.
12. Set lift.
13. The non-magnetic sleeve is welded, e.g., with a tack weld, to the pole piece.
14. The non-magnetic sleeve is welded, e.g., by a continuous wave laser forming a hermetic lap seal, to the pole piece.
15. Verify lift
16. A spring is loaded into the valve body/non-magnetic sleeve assembly.
17. A filter/adjusting tube is loaded into the valve body/non-magnetic sleeve assembly and pressed to a pre-cal position.
18. An inlet tube is connected to the valve body/non-magnetic sleeve assembly to generally establish the fuel group subassembly.
19. Axially press the fuel group subassembly to the desired over-all length.
20. The inlet tube is welded, e.g., by a continuous wave laser forming a hermetic lap seal, to the pole piece.
21. A second leak test is performed on the fuel group subassembly. This test can be performed pneumatically.
22. The fuel group subassembly can be moved outside the clean room and inverted so that the seat is oriented up.
23. An orifice is punched and loaded on the seat.
24. The orifice is welded, e.g., by a continuous wave laser forming a hermetic lap seal, to the seat.
25. The rotational orientation of the fuel group subassembly/orifice can be established with a "look/orient/look" procedure.
26. The fuel group subassembly is inserted into the (pre-assembled) power group subassembly.
27. The power group subassembly is pressed to a desired axial position with respect to the fuel group subassembly.
28. The rotational orientation of the fuel group subassembly/orifice/power group subassembly can be verified.
29. The power group subassembly can be laser marked with information such as part number, serial number, performance data, a logo, etc.
30. Perform a high-potential electrical test.
31. The housing of the power group subassembly is tack welded to the valve body.
32. A lower O-ring can be installed. Alternatively, this lower O-ring can be installed as a post test operation.
33. An upper O-ring is installed.
34. Invert the fully assembled fuel injector.
35. Transfer the injector to a test rig.

As an example, in a preferred embodiment, there are approximately forty-nine (49) clean room operations, seven (7) test processes, three (3) processes outside of the clean room, five (5) welding operations, one (1) machining or grinding processes, and five (5) screw machine processes that result in a sealed, or ready to be shipped, modular fuel injector unit. The total number of manufacturing operations can vary depending on variables such as, for example, whether the armature assembly 260 is pre-assembled or of one-piece construction, the lower guide and the seat being integrally formed or of separate constructions, the parts being fully finished or unfinished, etc. Other variables controlling the actual number of clean room operations, testing, welding, screw machine, grinding, machining, surface treatment and processes outside a clean room will be known to those skilled in the art, and are within the scope of this disclosure.

Thus, for cost-effectiveness in manufacturing, the clean room operations can constitute, inclusively, between 45–55% of the total manufacturing operations while testing processes can constitute, inclusively, between 3% and 8% of the total manufacturing operation. Likewise, the welding and screw machining operations can constitute, inclusively, between 3% and 9% of the total operations. The total operations prior to a sealed modular fuel injector unit can constitute, inclusively, between 12% and 19% of the total manufacturing processes.

To ensure that particulates from the manufacturing environment will not contaminate the fuel group subassembly, the process of fabricating the fuel group subassembly is preferably performed within a "clean room." "Clean room" here means that the manufacturing environment is provided with an air filtration system that will ensure that the particulates and environmental contaminants is continually removed from the clean room.

Despite the use of a clean room, however, particulates such as polymer flashing and metal burrs may still be present in the partially assembled fuel group. Such particulates, if not removed from the fuel injector, may cause the fully assembled injector to jam open, the effects, which may include engine inefficiency or even a hydraulic lock of the engine. To prevent such a scenario, the process can utilizes at least a washing process after a first leak test and a prior to a final flush process during break-in (or burn-in) of the injector.

To set the lift, i.e., ensure the proper injector lift distance, there are at least four different techniques that can be utilized. According to a first technique, a crush ring that is inserted into the valve body 240 between the lower guide 257 and the valve body 240 can be deformed. According to a second technique, the relative axial position of the valve body 240 and the non-magnetic shell 230 can be adjusted before the two parts are affixed together. According to a third technique, the relative axial position of the non-magnetic shell 230 and the pole piece 220 can be adjusted before the two parts are affixed together. And according to a fourth technique, a lift sleeve 255 can be displaced axially within the valve body 240. If the lift sleeve technique is used, the position of the lift sleeve can be adjusted by moving the lift sleeve axially. The lift distance can be measured with a test probe. Once the lift is correct, the sleeve is welded to the valve body 240, e.g., by laser welding. Next, the valve body 240 is attached to the inlet tube 210 assembly by a weld, preferably a laser weld. The assembled fuel group subassembly 200 is then tested, e.g., for leakage.

Figure 5:
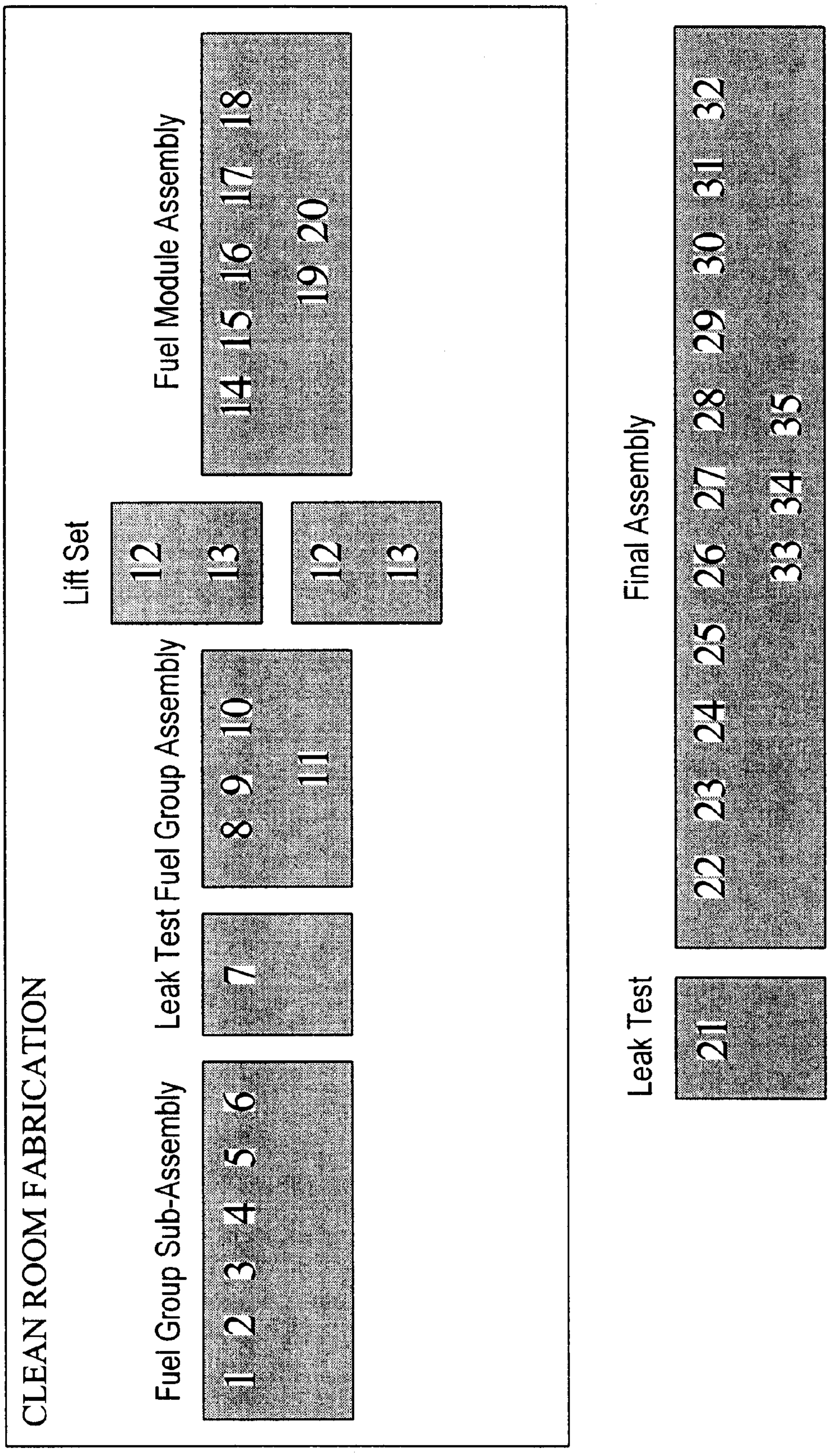
FIG. 5 is a chart of the method of assembling the modular fuel injector of the present invention.
Figure 5A:
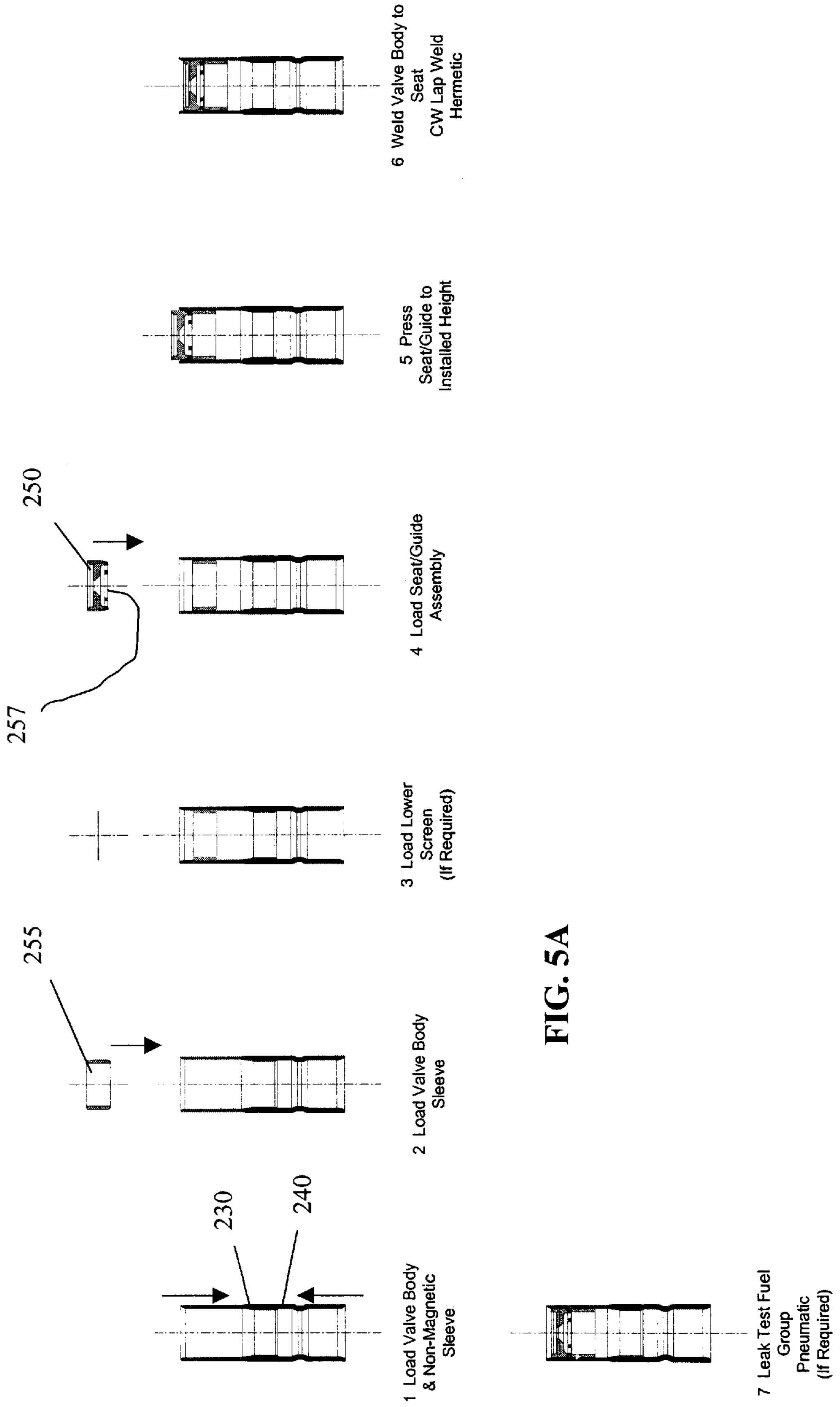
FIGS. 5A–5F are graphical illustrations of the method summarized in FIG. 5.
Figure 5B:
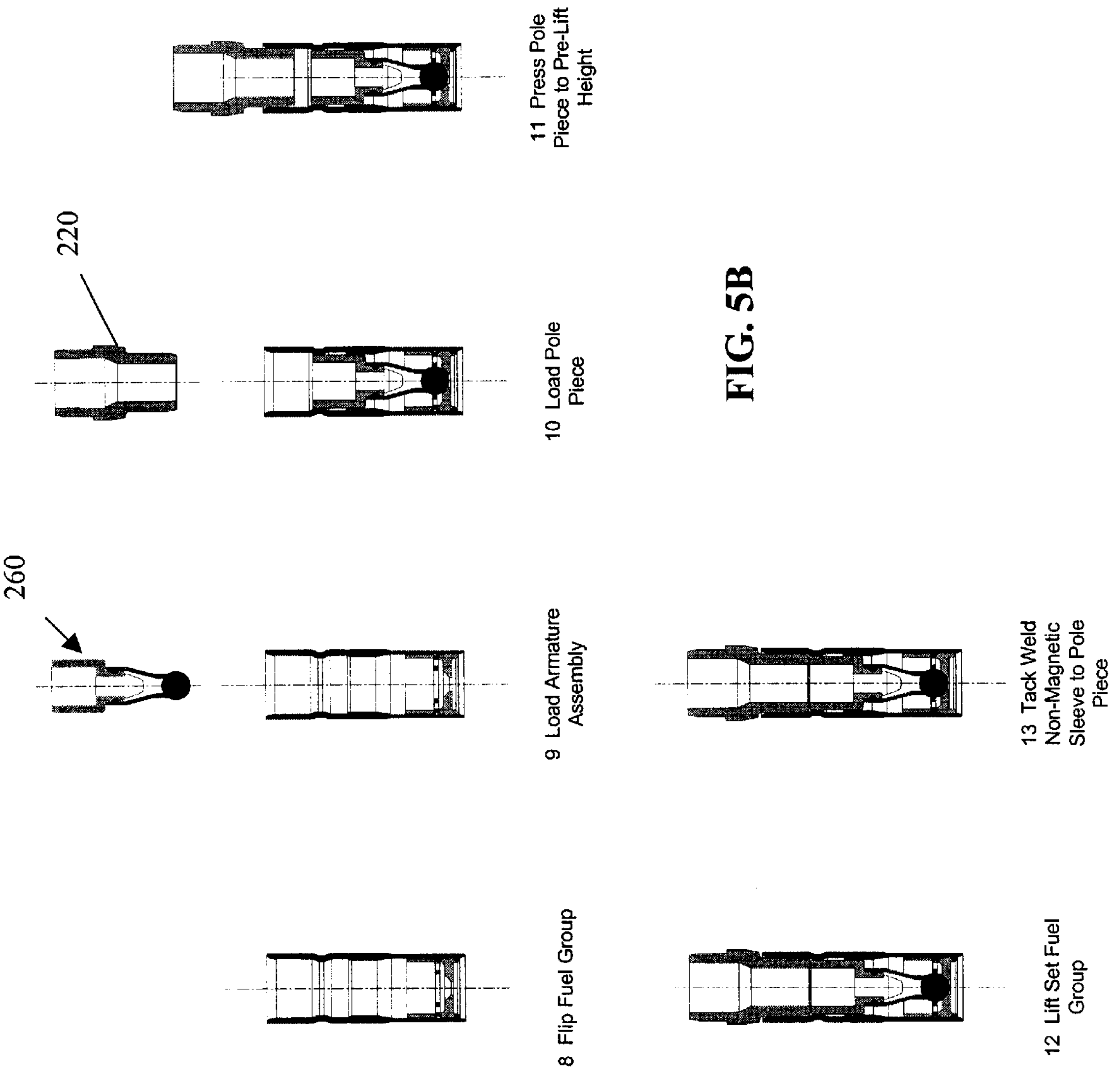
Figure 5C:
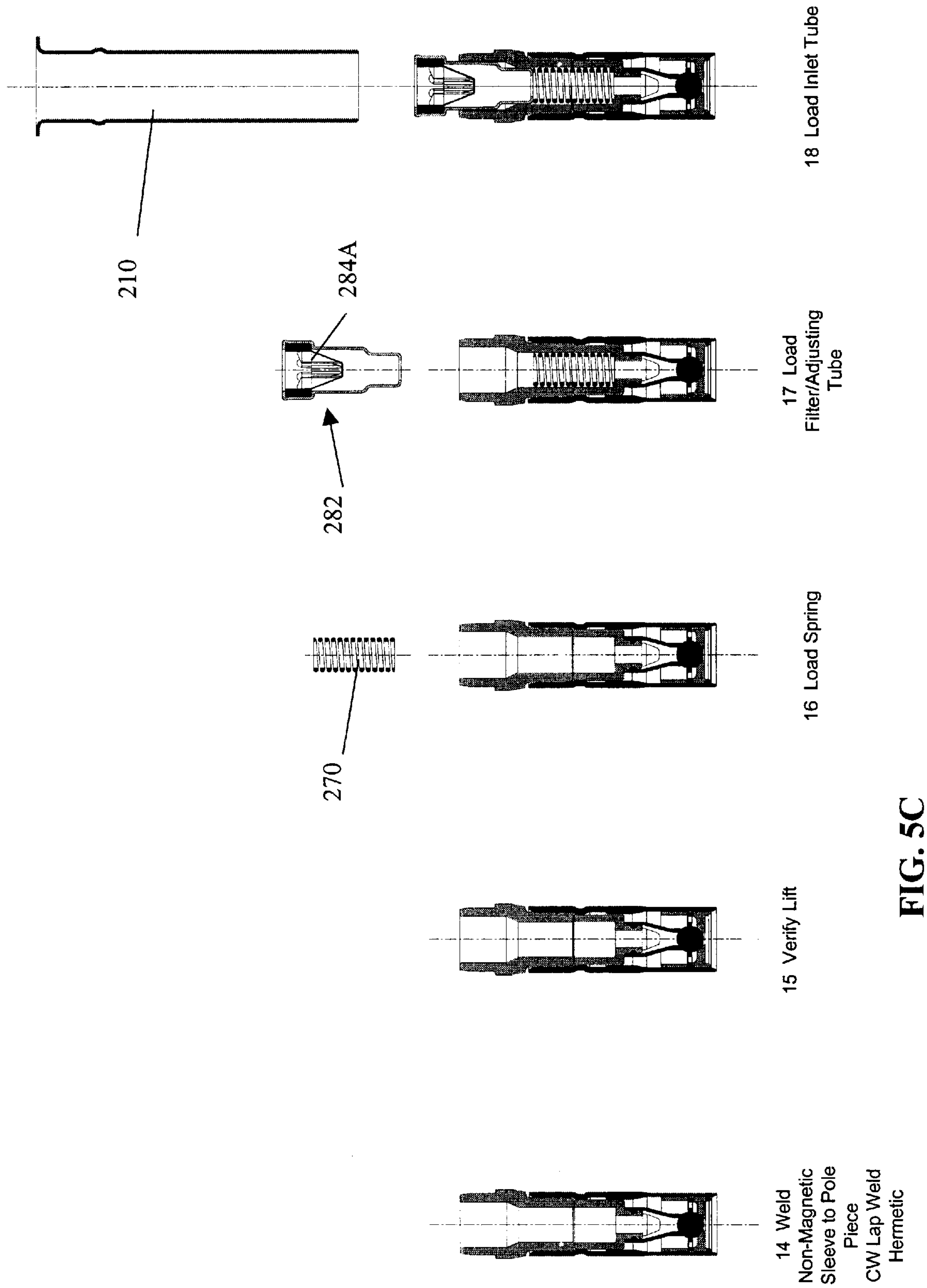
Figure 5D:
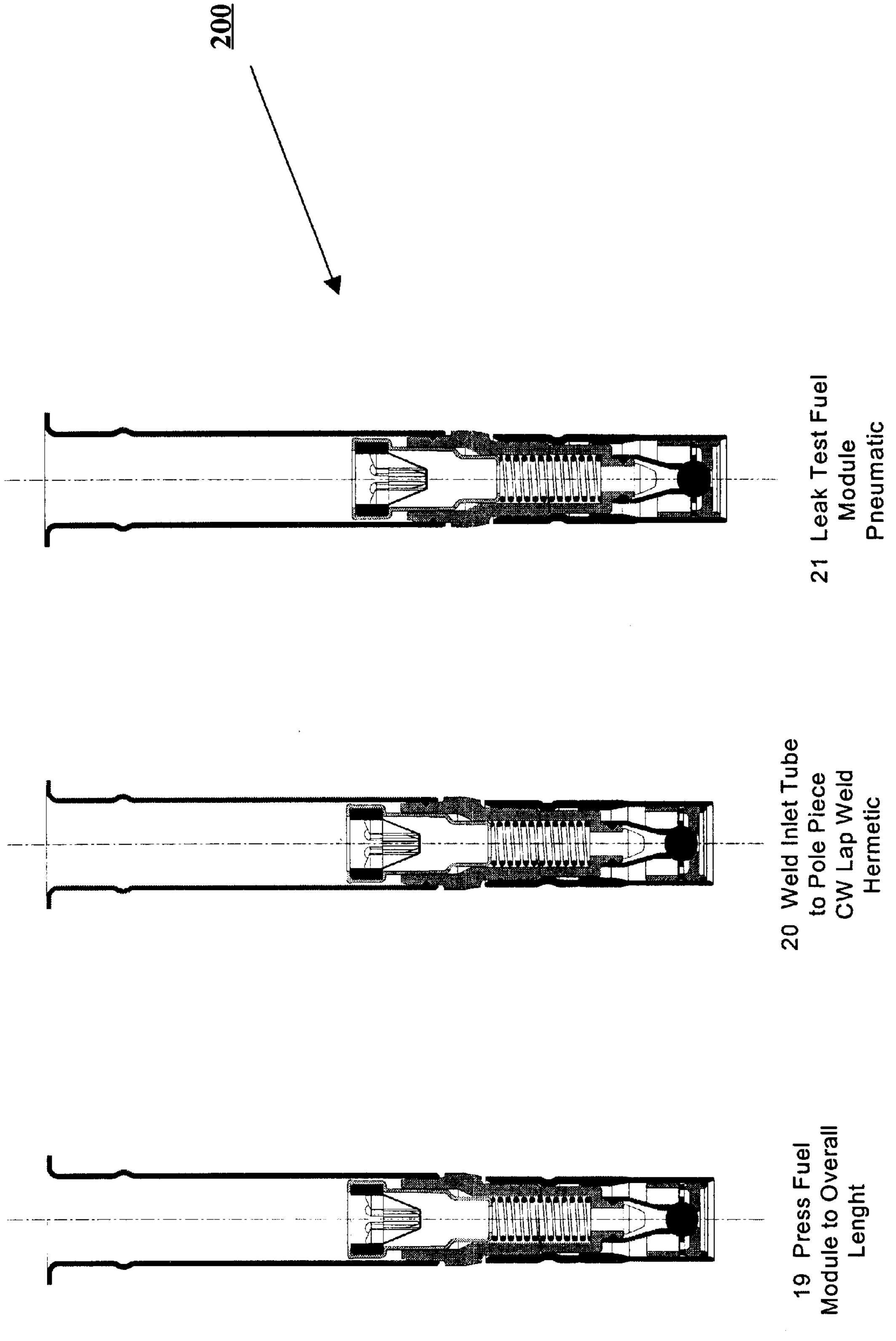

As is shown in FIGS. 5, 5B and 5C, the lift set procedure may not be able to progress at the same rate as the other procedures. Thus, a single production line can be split into a plurality (two are shown) of parallel lift setting stations, which can thereafter be recombined back into a single production line.

The preparation of the power group sub-assembly, which can include (a) the housing 330, (b) the bobbin assembly including the terminals 320, (c) the flux washer 334, and (d) the overmold 340, can be performed separately from the fuel group subassembly.

According to a preferred embodiment, wire 312 is wound onto a pre-formed bobbin 314 with at least one electrical contact 322 molded thereon. The bobbin assembly is inserted into a pre-formed housing 330. To provide a return path for the magnetic flux between the pole piece 220 and the housing 330, flux washer 334 is mounted on the bobbin assembly. A pre-bent terminal 320 having axially extending connector portions 324 are coupled to the electrical contact portions 322 and brazed, soldered welded, or preferably resistance welded. The partially assembled power group assembly is now placed into a mold (not shown). By virtue of its pre-bent shape, the terminals 320 will be positioned in the proper orientation with the harness connector 321 when a polymer is poured or injected into the mold. Alternatively, two separate molds (not shown) can be used to form a two-piece overmold as described with respect to FIG. 3A. The assembled power group subassembly 300 can be mounted on a test stand to determine the solenoid's pull force, coil resistance and the drop in voltage as the solenoid 310 is saturated.

Figure 5E:
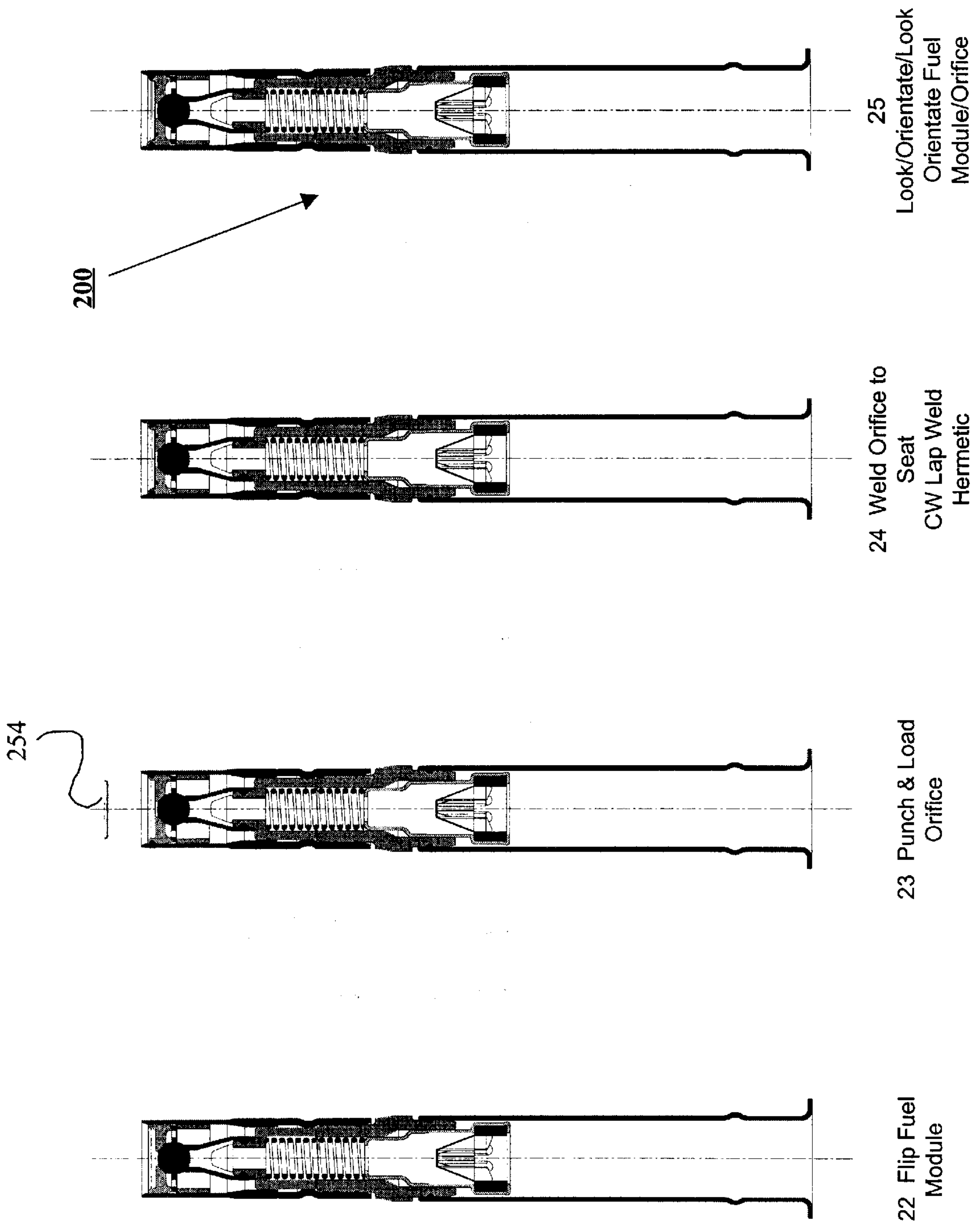
Figure 5F:
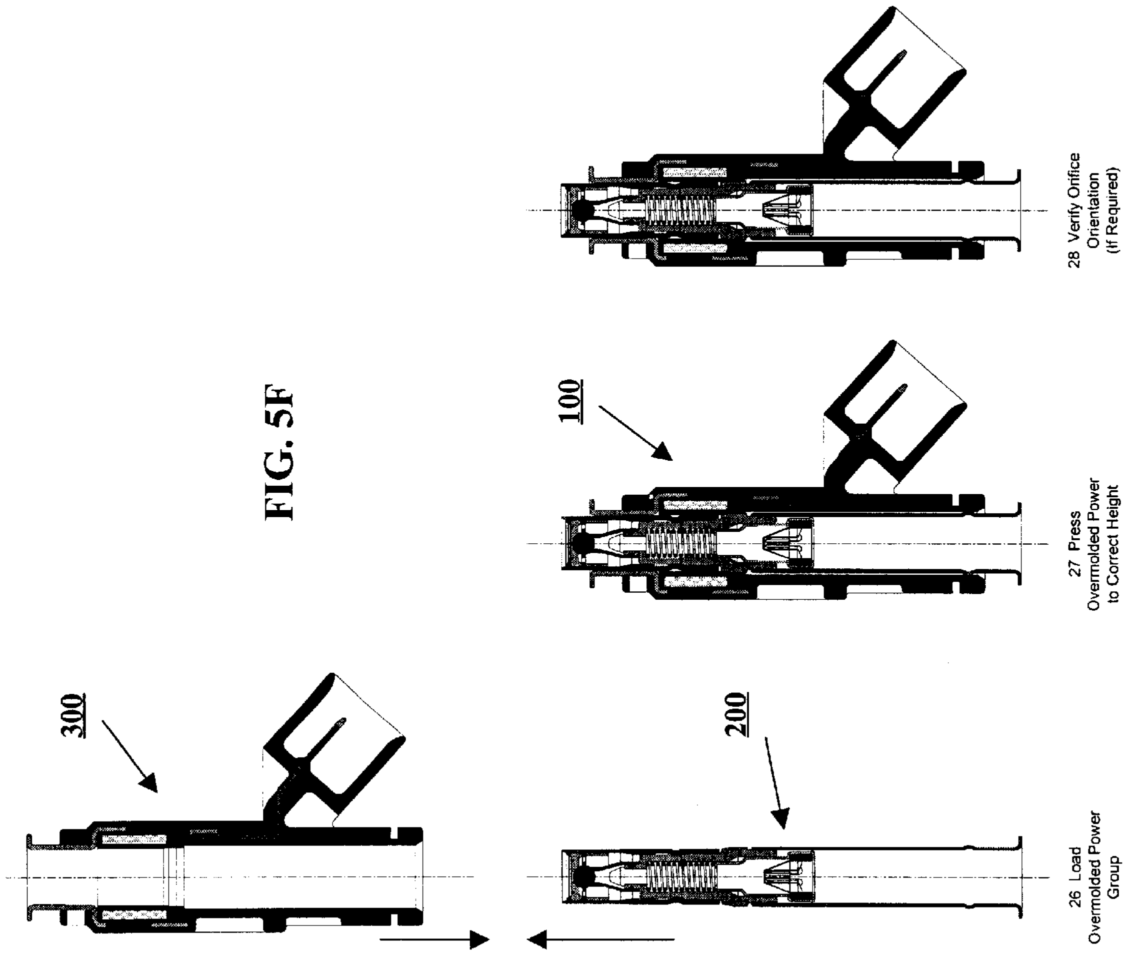

The inserting of the fuel group subassembly 200 into the power group subassembly 300 operation, shown in FIG. 5E, can involve setting the relative rotational orientation of fuel group subassembly 200 with respect to the power group subassembly 300. According to the preferred embodiments, the fuel group can be rotated such that the included angle between a reference point on the orifice plate 254 and a reference point on the injector harness connector 321 is within a predetermined angle. The relative orientation can be set using robotic cameras or computerized imaging devices to look at respective predetermined reference points on the subassemblies, calculating the amount of rotation required as a function of the difference in the angle between the reference points, orientating the subassemblies and then checking with another look and so on until the subassemblies are properly orientated. Once the desired orientation is achieved, the subassemblies are then inserted together.

The inserting operation can be accomplished by one of two methods: "top-down" or "bottom-up." According to the former, the power group subassembly 300 is slid downward from the top of the fuel group subassembly 200, and according to the latter, the power group subassembly 300 is slid upward from the bottom of the fuel group subassembly 200. In situations where the inlet tube 210 assembly includes a flared first end, bottom-up method is required. Also in these situations, the O-ring 290 that is retained by the flared first end can be positioned around the power group subassembly 300 prior to sliding the fuel group subassembly 200 into the power group subassembly 300. After inserting the fuel group subassembly 200 into the power group subassembly 300, these two subassemblies are affixed together, e.g., by welding, such as laser welding. According to a preferred embodiment, the overmold 340 includes an opening 360 that exposes a portion of the housing 330. This opening 360 provides access for a welding implement to weld the housing 330 with respect to the valve body 240. Of course, other methods or affixing the subassemblies with respect to one another can be used. Finally, the O-ring 290 at either end of the fuel injector can be installed.

The method of assembly of the preferred embodiments, and the preferred embodiments themselves, are believed to provide manufacturing advantages and benefits. For example, because of the modular arrangement only the valve group subassembly is required to be assembled in a "clean" room environment. The power group subassembly 300 can be separately assembled outside such an environment, thereby reducing manufacturing costs. Also, the modularity of the subassemblies permits separate pre-assembly testing of the valve and the coil assemblies. Since only those individual subassemblies that test unacceptable are discarded, as opposed to discarding fully assembled injectors, manufacturing costs are reduced. Further, the use of universal components (e.g., the coil/bobbin unit, non-magnetic shell 230, seat 250, closure member 264, filter/retainer assembly 282; etc.) enables inventory costs to be reduced and permits a "just-in-time" assembly of application specific injectors. Only those components that need to vary for a particular application, e.g., the terminal 320 and inlet tube 210 need to be separately stocked. Another advantage is that by locating the working air gap, i.e., between the armature assembly 260 and the pole piece 220, within the electromagnetic coil, the number of windings can be reduced. In addition to cost savings in the amount of wire 312 that is used, less energy is required to produce the required magnetic flux and less heat builds-up in the coil (this heat must be dissipated to ensure consistent operation of the injector). Yet another advantage is that the modular construction enables the orifice disk 254 to be attached at a later stage in the assembly process, even as the final step of the assembly process. This just-in-time assembly of the orifice disk 254 allows the selection of extended valve bodies depending on the operating requirement. Further advantages of the modular assembly include out-sourcing construction of the power group subassembly 300, which does not need to occur in a clean room environment. And even if the power group subassembly 300 is not out-sourced, the cost of providing additional clean room space is reduced.

While the present invention has been disclosed with reference to certain embodiments, numerous modifications, alterations, and changes to the described embodiments are possible without departing from the sphere and scope of the present invention, as defined in the appended claims. Accordingly, it is intended that the present invention not be limited to the described embodiments, but that it have the full scope defined by the language of the following claims, and equivalents thereof

What is claimed is:

1. A method of manufacturing a modular fuel injector, the method comprising:

providing a clean room;

manufacturing a sealed fuel injector unit via a predetermined number of operations, the manufacturing including:

fabricating a fuel group in the clean room;

testing the fuel injector including testing the fuel group and a power group;

performing welding operations on at least one of the fuel group and the power group;

machining and performing screw machine operations on at least one of the fuel group and the power group; and assembling outside the clean room the fuel group with the power group into a sealed modular fuel injector unit;

wherein each of the fabricating, testing, performing, machining and assembling includes, respectively, a specified range of the predetermined number of operations, and the specified range of operations of the fabricating exceeds the respective specified ranges of operations for each of the testing, the performing, the machining, and the assembling.

2. The method according to claim 1, wherein the fabricating comprises between 52 and 62 percent of the predetermined number of operations.

3. The method according to claim 1, wherein the testing comprises between 3 and 13 percent of the predetermined number of operations.

4. The method according to claim 1, wherein the assembling outside the clean room comprises between 12 and 19 percent of the predetermined number of operations.

5. The method according to claim 1, wherein the machining and screw machine operations comprise between 3 and 9 percent of the predetermined number of operations.

6. A method of assembling a modular fuel injector, comprising:

providing a clean room;

assembling a ready-to-deliver modular fuel injector unit by a predetermined number of assembling operations, the assembling operation including: fabricating a fuel group in the clean room that comprises between 52 to 62 percent of the predetermined number of operations;

testing the fuel injector including testing the fuel group and a power group that comprises between 3 to 13 percent of the predetermined number of operations;

performing welding operations on at least one of the fuel group and power group that comprise between 3 to 8 percent of the predetermined number of operations;

machining and performing machine screw operations on at least one of the fuel group and power group that comprise between 3 to 9 percent of the predetermined number of operations; and assembling the fuel group with a power group outside the clean room into a ready-to-deliver modular fuel injector unit that comprises between 12 to 22 percent of the predetermined number of operations.

* * * * *